(12) United States Patent
Geier et al.

(10) Patent No.: US 12,544,186 B2
(45) Date of Patent: Feb. 10, 2026

(54) SURGICAL GUIDE CHECK

(71) Applicant: BIOMET 3i, LLC, Palm Beach Gardens, FL (US)

(72) Inventors: Andreas Geier, Gargazon (IT); Zachary B. Suttin, Jupiter, FL (US)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 312 days.

(21) Appl. No.: 18/091,093

(22) Filed: Dec. 29, 2022

(65) Prior Publication Data

US 2023/0210631 A1 Jul. 6, 2023

Related U.S. Application Data

(60) Provisional application No. 63/295,769, filed on Dec. 31, 2021.

(51) Int. Cl.

| | |
|---|---|
| *A61C 1/08* | (2006.01) |
| *A61B 34/10* | (2016.01) |
| *A61B 90/11* | (2016.01) |
| *A61C 8/00* | (2006.01) |
| *A61C 9/00* | (2006.01) |
| *A61C 13/34* | (2006.01) |
| *A61C 19/04* | (2006.01) |

(52) U.S. Cl.
CPC ............ *A61C 1/084* (2013.01); *A61B 90/11* (2016.02); *A61C 8/0089* (2013.01); *A61C 19/04* (2013.01); *A61B 2034/102* (2016.02); *A61B 2034/108* (2016.02); *A61C 9/004* (2013.01); *A61C 13/34* (2013.01); *G06T 2207/30036* (2013.01)

(58) Field of Classification Search
CPC ....... A61C 1/084; A61C 8/0089; A61C 19/04; A61C 9/004; A61C 13/34; A61B 90/11; A61B 2034/102; A61B 2034/108; G06T 2207/30036
See application file for complete search history.

(56) References Cited

U.S. PATENT DOCUMENTS 9,566,137 B2 * 2/2017 Hehn .................... A61C 9/0053
11,284,967 B2 * 3/2022 Schmälzle ........... A61C 8/0089
(Continued)

FOREIGN PATENT DOCUMENTS

DE    102011083439       3/2013
WO   WO-2007015140 A2 * 2/2007 ............. A61C 1/084
(Continued)

OTHER PUBLICATIONS

Extended European Search Report for European Application No. 22217106.8, dated May 17, 2023 7 pages.

*Primary Examiner* — Ryan D Walsh
(74) *Attorney, Agent, or Firm* — Sheridan Ross P.C.

(57) ABSTRACT

A method and a device for the simplified inspection of the compatibility of the positions of master tubes in a surgical guides with respect to the positions in a predetermined plan in a computer model. For example, during virtual planning, the virtual surgical guide includes master tubes having an axis that is the axis (e.g., an installation axis) along which a dental implant will be installed. The virtual surgical guide can be manufactured, e.g., by substrative methods and additive methods. As discussed herein, the accuracy of the physical surgical guide can be checked physically or virtually.

16 Claims, 12 Drawing Sheets

(56) References Cited

U.S. PATENT DOCUMENTS

| | | | |
|---|---|---|---|
| 2006/0105291 A1 | 5/2006 | Stein et al. | |
| 2009/0263764 A1* | 10/2009 | Berckmans, III | A61B 34/10 |
| | | | 433/215 |
| 2010/0316974 A1* | 12/2010 | Yau | A61C 1/084 |
| | | | 433/215 |
| 2013/0309628 A1 | 11/2013 | Orth et al. | |
| 2014/0272779 A1* | 9/2014 | Okay | A61C 9/0053 |
| | | | 433/173 |
| 2015/0030995 A1* | 1/2015 | Villa | A61C 8/009 |
| | | | 433/196 |
| 2015/0359479 A1 | 12/2015 | Crandall et al. | |
| 2016/0135931 A1* | 5/2016 | Morales | A61C 8/0048 |
| | | | 433/213 |
| 2022/0054238 A1* | 2/2022 | Kim | A61C 1/084 |

FOREIGN PATENT DOCUMENTS

| | | | | |
|---|---|---|---|---|
| WO | WO-2011010177 A1 * | 1/2011 | | A61C 1/084 |
| WO | WO 2017/182046 | 10/2017 | | |
| WO | WO 2020/084616 | 4/2020 | | |

\* cited by examiner

SURGICAL GUIDE CHECK

CROSS-REFERENCE TO RELATED APPLICATION

This application claims the benefit of U.S. Provisional Application No. 63/295,769, filed on Dec. 31, 2021, which is incorporated herein by reference in its entirety.

TECHNICAL FIELD

A method and a device for the simplified inspection of the compatibility of the positions of master tubes in a surgical guide with respect to the positions in a predetermined plan in a computer model.

BACKGROUND

The dental restoration of a partially or wholly edentulous patient with artificial dentition is typically done in two stages. In the first stage, an incision is made through the gingiva to expose the underlying bone. After a series of drill bits creates an osteotomy in the bone, a dental implant is placed in the jawbone for integration. The dental implant generally includes a threaded bore to receive a retaining screw holding mating components therein. During the first stage, the gum tissue overlying the implant is sutured and heals as the osseointegration process continues.

Once the osseointegration process is complete, the second stage is initiated. Here, the gum tissue is re-opened to expose the end of the dental implant. A healing component or healing abutment is fastened to the exposed end of the dental implant to allow the gum tissue to heal therearound. Preferably, the gum tissue heals such that the aperture that remains generally approximates the size and contour of the aperture that existed around the natural tooth that is being replaced. To accomplish this, the healing abutment attached to the exposed end of the dental implant has the same general contour as the gingival portion of the natural tooth being replaced.

During the typical second stage of dental restoration, the healing abutment is removed and an impression coping is fitted onto the exposed end of the implant. This allows an impression of the specific region of the patients mouth to be taken so that an artificial tooth is accurately constructed. After these processes, a dental laboratory creates a prosthesis to be permanently secured to the dental implant from the impression that was made.

In addition to the more traditional system for placing dental implants described above, some systems use guided placement of the dental implants. To do so, a surgical guide is placed in the patient's mouth at the known location. The surgical guide includes openings for providing the exact placement of the drill bits used to create the osteotomy. Once the osteotomy is completed, the surgical guide may permit the dental implant to be placed through the same opening and enter the osteotomy that was guided by the surgical guide.

Surgical guides can be created by the use of a CT-scan of the patient's mouth. The CT-scan provides enough detail to develop the surgical guide by use of various methods. For example, a CT-scan can provide the details of the patient's gum tissue and/or remaining teeth so that the surgical guide can be developed based on computer-aided design (CAD) and computer-aided manufacturing (CAM).

However, with digital design and the manufacture of the physical surgical guide a need exits to determine that the physical surgical guide matches the virtually designed surgical guide.

SUMMARY

In one aspect, the present invention provides a system for checking the accuracy of a manufactured surgical guide. For example, during virtual planning, the virtual surgical guide includes master tubes having an axis that is the axis that a dental implant will be installed. The virtual surgical guide can be manufactured, e.g., by substrative methods and additive methods. Substrative methods include milling and additive methods can include rapid prototyping techniques such as: stereolithography, laminated-object manufacturing, selective laser sintering, solid ground curing, or other known rapid prototyping processes.

In one aspect, once the virtual surgical guide design is completed, manufacturing data is sent for the physical surgical guide to be fabricated. Once fabricated the master tubes can be inserted within the physical surgical guide. However, manufacturing errors or errors while inserting the master tubes can potentially offset the axis of the master tubes such that the axis of the master tubes within the physical surgical guide no longer match the axis of the maters tubes in the virtually designed surgical guide. Additionally, once the virtually design is complete, a check protocol form is also developed and sent to a traditional paper printer. As discussed herein, the physical surgical guide including the master tubes and the check protocol form can be combined to determine the accuracy of the physical surgical model.

In one aspect, the accuracy of the physical surgical guide can be checked digitally. For example, once the physical surgical guide is manufactured and the master tubes are inserted, scan bodies are attached to each master tube. The physical surgical guide with the scan bodies are scanned to obtain digital scan data of the physical surgical guide. The scan bodies allow the location and orientation of the master tubes to be determined. For example, an axis of the master tubes can be determined from that scan data including the scan bodies. The method can include merging the virtually designed surgical guide with the scan data of the physical surgical guide with the scan bodies and determine whether the axis of the master tubes in the physical surgical guide match the axis of the master tubes in the virtually designed guide.

These and other examples, advantages, and features of the present dental membranes will be set forth in part in the following Detailed Description and the accompanying drawings. This Overview is intended to provide non-limiting examples of the present subject matter it is not intended to provide an exclusive or exhaustive explanation. The Detailed Description and drawings are included to provide further information about the present porous metal dental implants.

BRIEF DESCRIPTION OF THE DRAWINGS

The above-mentioned and other features and advantages of this disclosure, and the manner of attaining them, will become more apparent and will be better understood by reference to the following description of embodiments of the disclosure taken in conjunction with the accompanying drawings.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
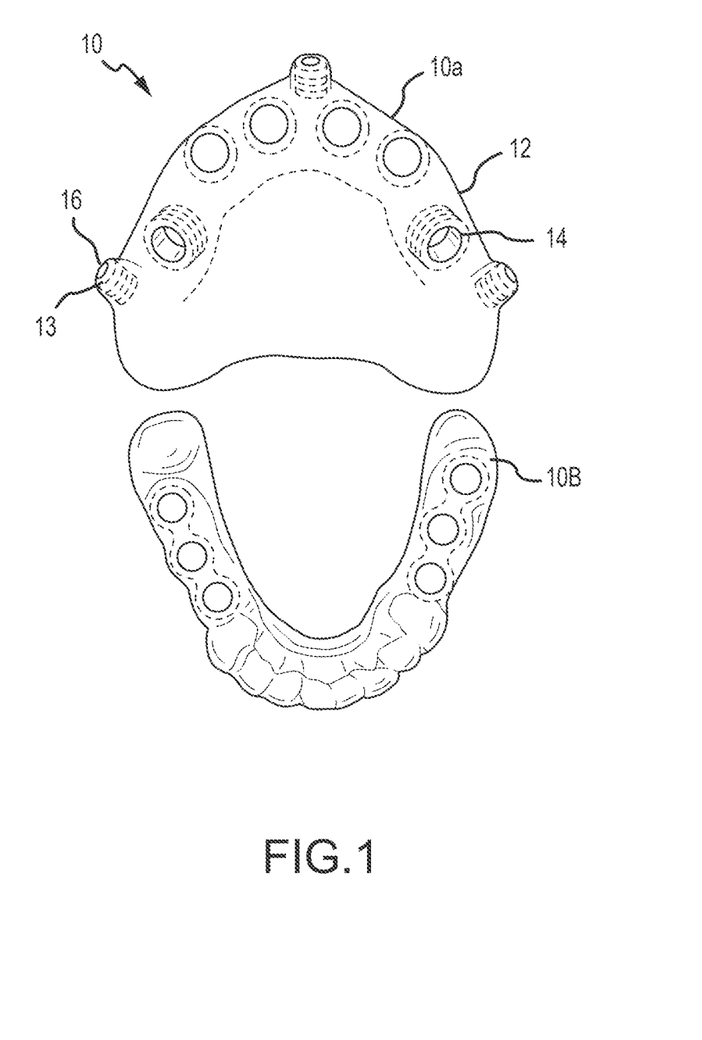
FIG. 1 illustrates a perspective view of a physical surgical guide including master tubes, in accordance with at least one example of the present disclosure.

The present invention provides a system for checking the accuracy of a manufactured surgical guide. For example, during virtual planning, the virtual surgical guide includes master tubes having an axis that is the axis that a dental implant will be installed. The virtual surgical guide can be manufactured, e.g., by substrative methods and additive methods. As discussed herein, the accuracy of the physical surgical guide can be checked physically or virtually, FIG. 1 illustrates a physical surgical guide 10 including a body 12 and master tubes 14. The surgical guide 10 can be produced from various materials and techniques. One preferred method is using a rapid-prototyping technique based on the scanned images within the patient's mouth. In the example, there is a need for six implants on the top jaw 10A and six implant on the bottom jaw 10B, thus, the surgical guide 10 includes six opening on the top jaw surgical guide 10A and six opening on the bottom jaw surgical guide 10B, each of which is defined by a master tube 14 that is integrated into the material of the surgical guide 10 with the assistance of the outer roughened surface and adhesive. The master tubes 14 are located on flat surfaces that are substantially flush with the top surface of the master tubes 14. The under portion of the surgical guide (not visible in FIG. 1) has a contour that follows the scanned gingival surface in the patient's mouth. In other words, the under portion of the surgical guide 10 is a negative impression of the gingival surface. The surgical guide also includes a plurality of openings 13 through which temporary fixation screws 16 or pins can be placed. The temporary fixation screws or pins engage the bone and hold the surgical guide 10 in the proper location on the gingival surface so that the dental plan can be executed using the surgical guide 10. As mentioned previously, the surgical guide 10 can also be a negative impression of the surface of adjacent teeth and bone tissue in some situations and rest against the adjacent teeth and bone tissue. Examples of fabricating surgical guides can be found in U.S. Pat. No. 10,678,885, which is incorporated herein by reference in its entirety.

Figure 2A:
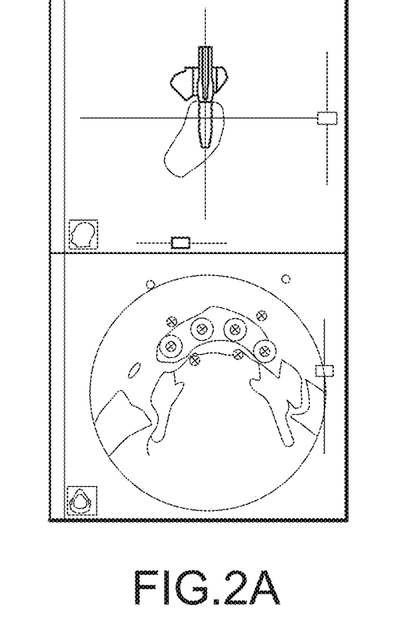
FIG. 2A illustrates a virtually designing a surgical plan including at least one implant, in accordance with at least one example of the present disclosure.
Figure 2B:
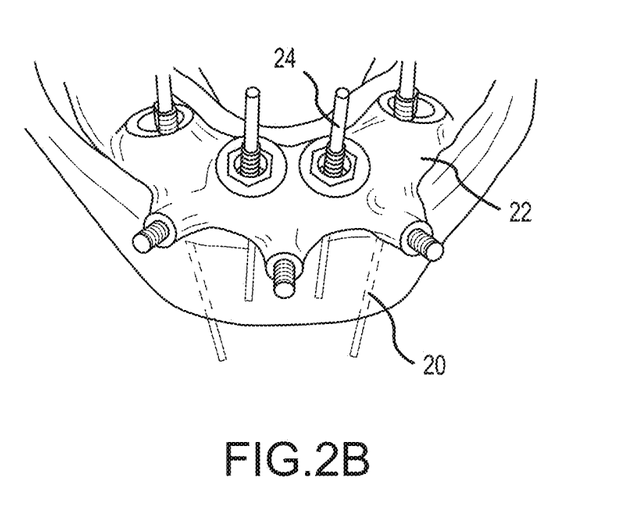
FIG. 2B illustrates a virtually designed surgical guide of the surgical plan including at least one master tube, in accordance with at least one example of the present disclosure.

FIGS. 2A and 2B illustrate the virtually designing of the surgical guide and location and orientation of dental implant. As seen in FIG. 2A, the location of the dental implants is determined. As seen in FIG. 2B, the display includes a virtual representation of the patient's mouth 20, a virtual surgical guide 22, and the axis 24 along with the dental implant is inserted into the virtual model.

Figure 3:
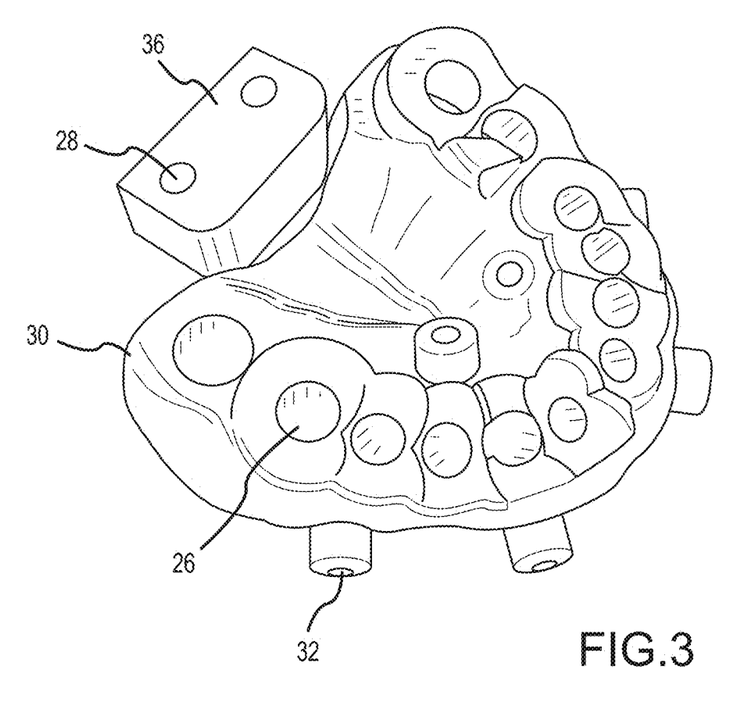
FIG. 3 illustrates a perspective view of the manufactured physical surgical guide in accordance with at least one example of the present disclosure.
Figure 4:
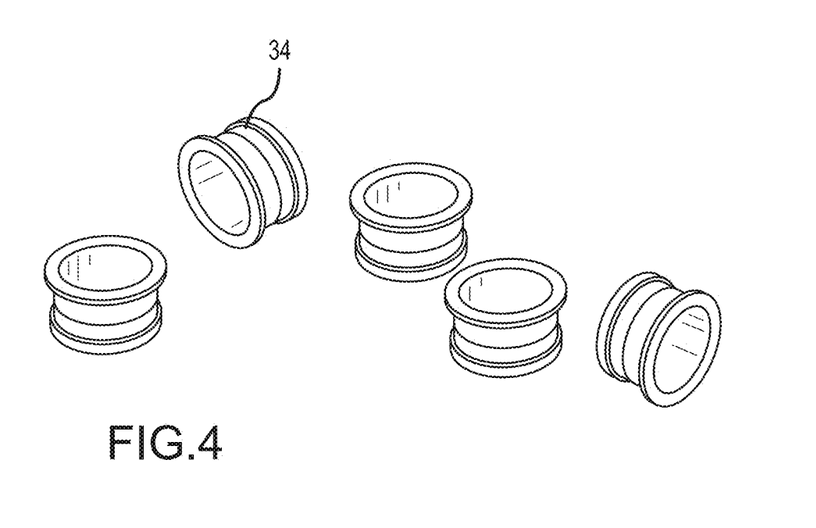
FIG. 4 illustrates a plurality of master tubes to be inserted into the physical surgical guide, in accordance with at least one example of the present disclosure.
Figure 5:
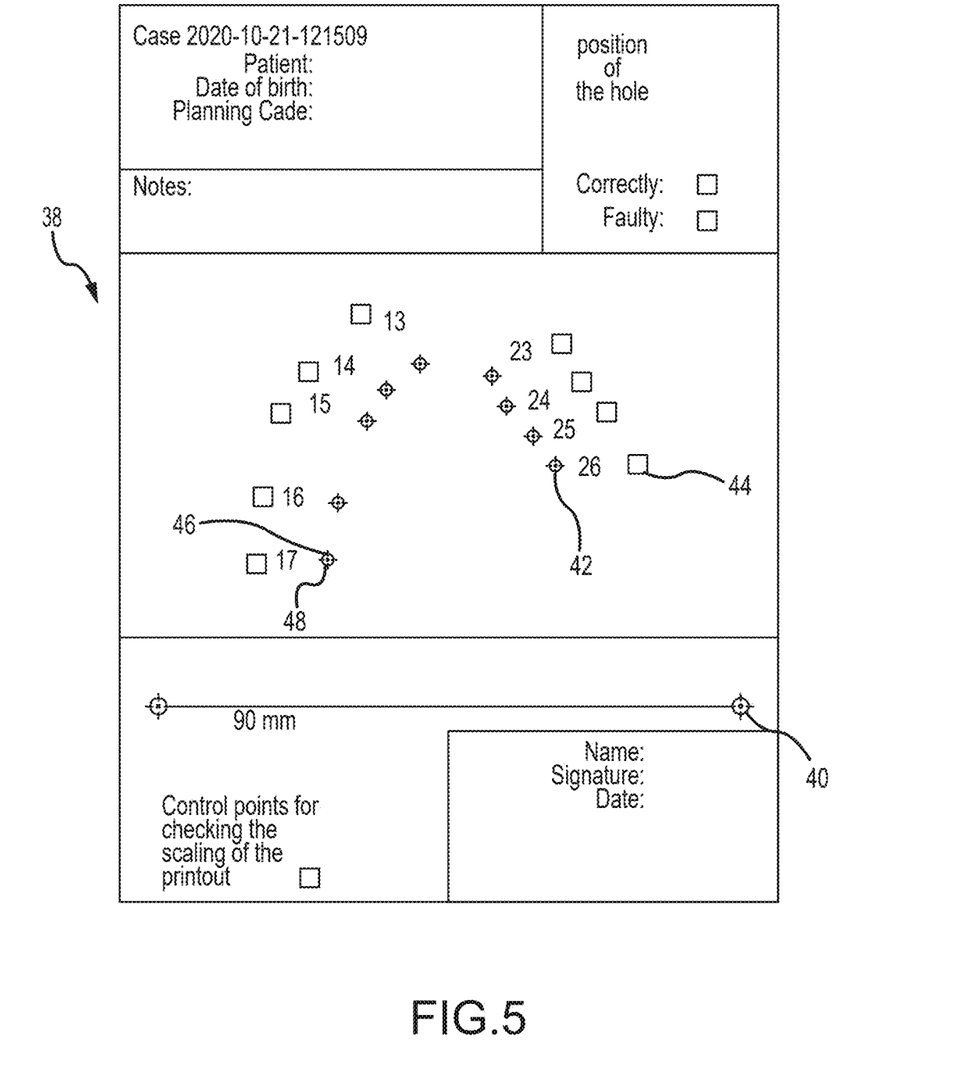
FIG. 5 illustrates a check protocol form that corresponds to the virtually designed surgical plan, in accordance with at least one example of the present disclosure.

Once the surgical plan including the surgical guide having master tubes is finalized, manufacturing information is sent to a fabrication machine, e.g., a rapid prototyping machine. As seen in FIG. 3, a physical surgical guide 30 has been formed. The physical surgical guide 30 includes openings 26 that are configured to receive master tubes 34 (FIG. 4), opening 32 that are configured to receive the fixation pins 13 (FIG. 1), and a check booth attachment flange 36 including opening. A user would couple the master tubes 34 to the surgical guide 30. Along with manufacturing the surgical guide 30, a check protocol form 38 is also produced and sent to a traditional paper printer. The check protocol form 38 includes a calibration check points 40 that is configured to determine whether the dimensions of the check protocol form 38 are accurate. The form 38 further includes pointes 42 that correspond to the axis along which each implant is to be installed along and in relation to each other. The point 42 includes a center point 46 corresponding to the axis along which each implant is to be installed as well as a circle 48 surrounding the center point 36. The circle 48 defines the acceptable tolerance of the axis of the surgical guide. As discussed herein, during the checking procedure a pin must be within the circle 48 for that particular master tube to pass inspection.

Figure 6:
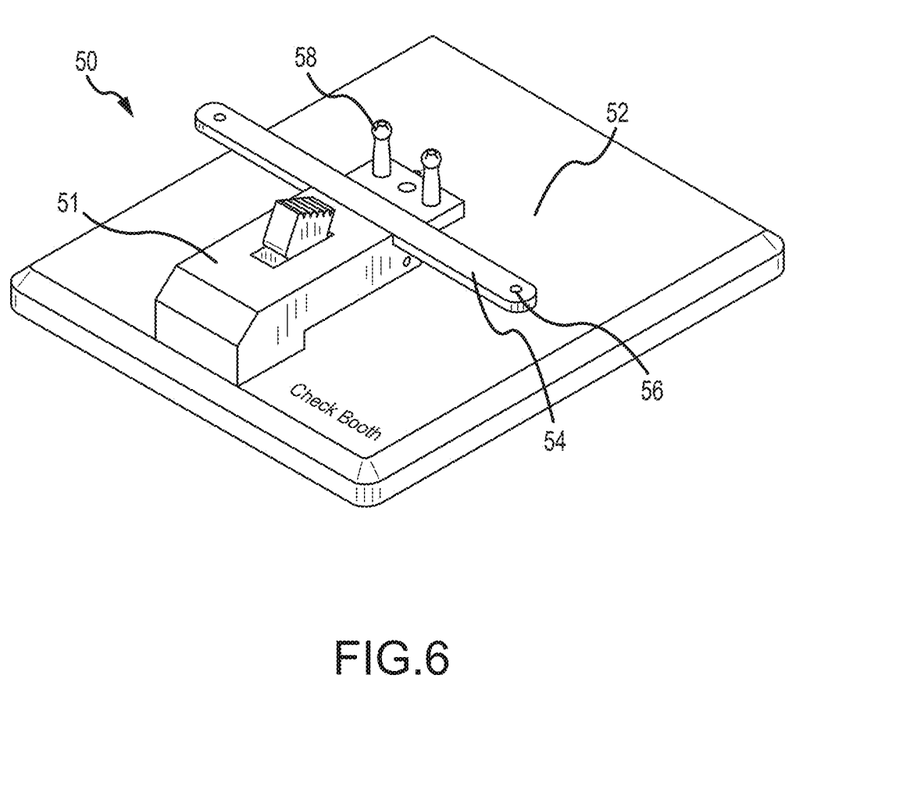
FIG. 6 illustrates a perspective view of a check booth used to check the accuracy of the physical surgical guide, in accordance with at least one example of the present disclosure.
Figure 7:
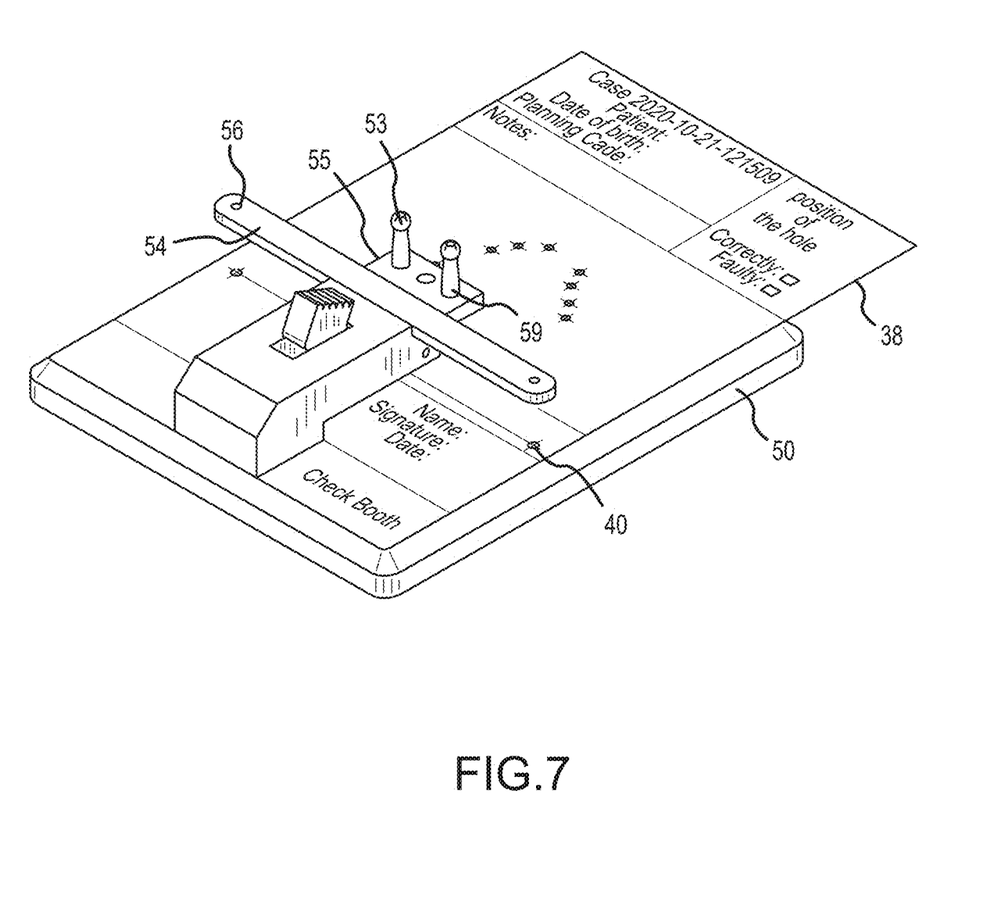
FIG. 7 illustrates the check protocol form attached to the check booth, in accordance with at least one example of the present disclosure.
Figure 8:
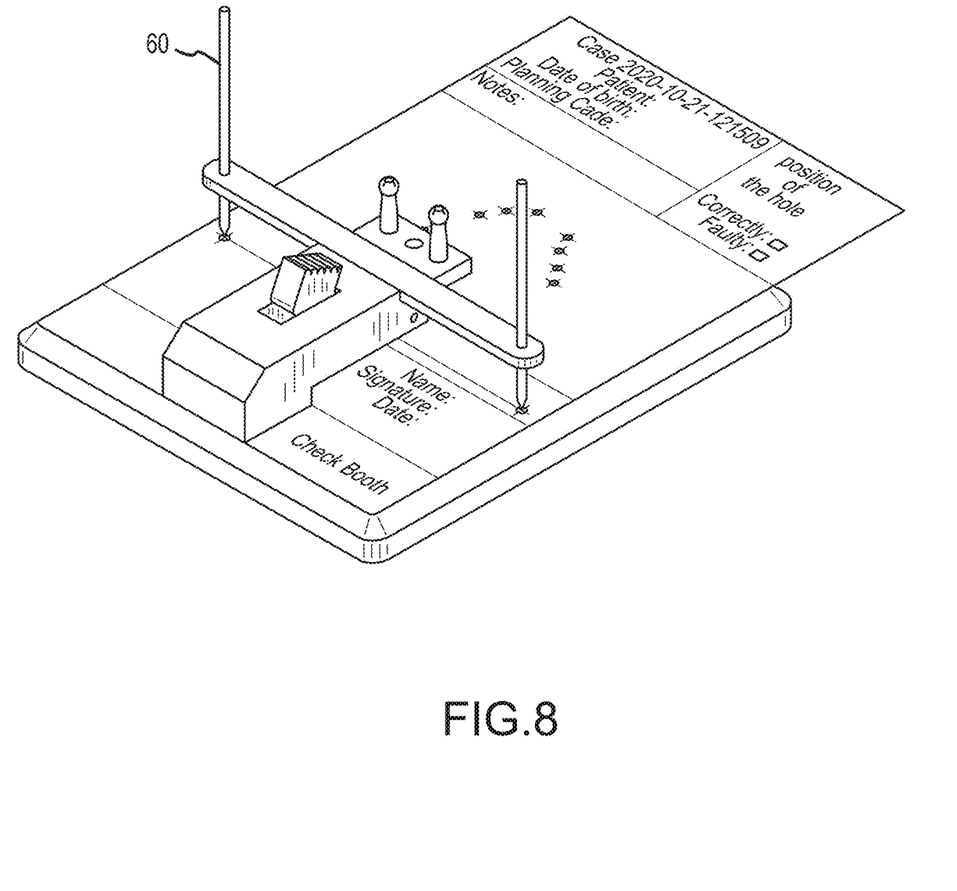
FIG. 8 illustrates an initial check of the accuracy of the check protocol form, in accordance with at least one example of the present disclosure.

FIG. 6 illustrates a check booth 50 that is configured to receive the form 38. The booth 50 includes a support surface 52 and a checking support 51 coupled to the support surface 52. The checking support 51 is moveable such that the support 52 can be lifted such that the form 38 can be inserted on the support surface 52 (see FIG. 7). To secure the form 38 to the check booth 50, the check support 51 can be biases towards the support surface 52 (e.g., a biasing member) such that pressure is placed on the form 38 thereby securing the form 38 to the booth 50. The checking support 51 includes a calibration member 54 defining openings 56. As seen in FIG. 7, the calibration member 54 and openings 56 align with the calibration check points 40 on the form 38. A distance between the openings 56 should match a distance between the calibration check points 40 to confirm that the dimensions of the form 38 match the dimensions of the virtual surgical plan. FIG. 8 illustrates calibration pins 60 inserted through the openings 56. As seen in FIG. 8, the tip of the calibration pins 60 are within the calibration check points 40 thus confirming the dimensions of the form 38 are accurate.

Figure 9:
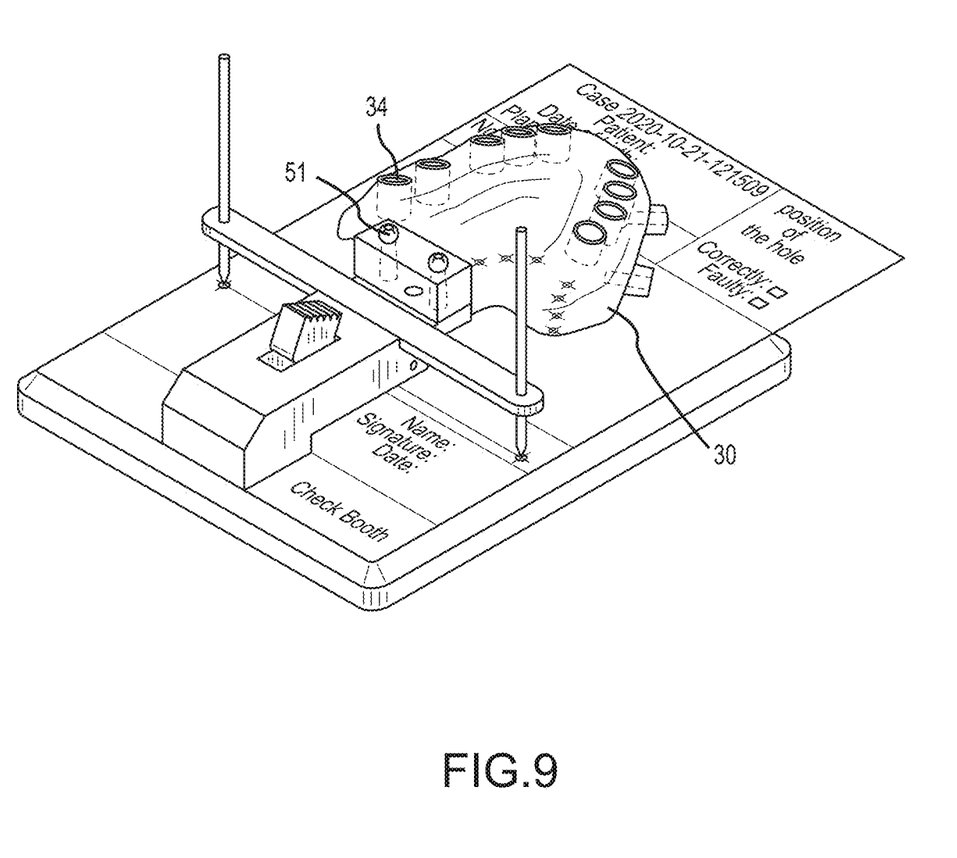
FIG. 9 illustrates the surgical guide attached to the check booth, in accordance with at least one example of the present disclosure.

The check booth 50 further includes a support structure 55 to couple the physical surgical guide to the check booth 50. As seen in FIG. 7, the support structure 55 includes openings 59 through which engagement pins 53 are inserted. FIG. 9 illustrates the physical surgical guide 30 including the master tubes 34 coupled to the check booth 50 via engagement pins 53 that extend through openings 28 of the surgical guide 30.

Figure 10:
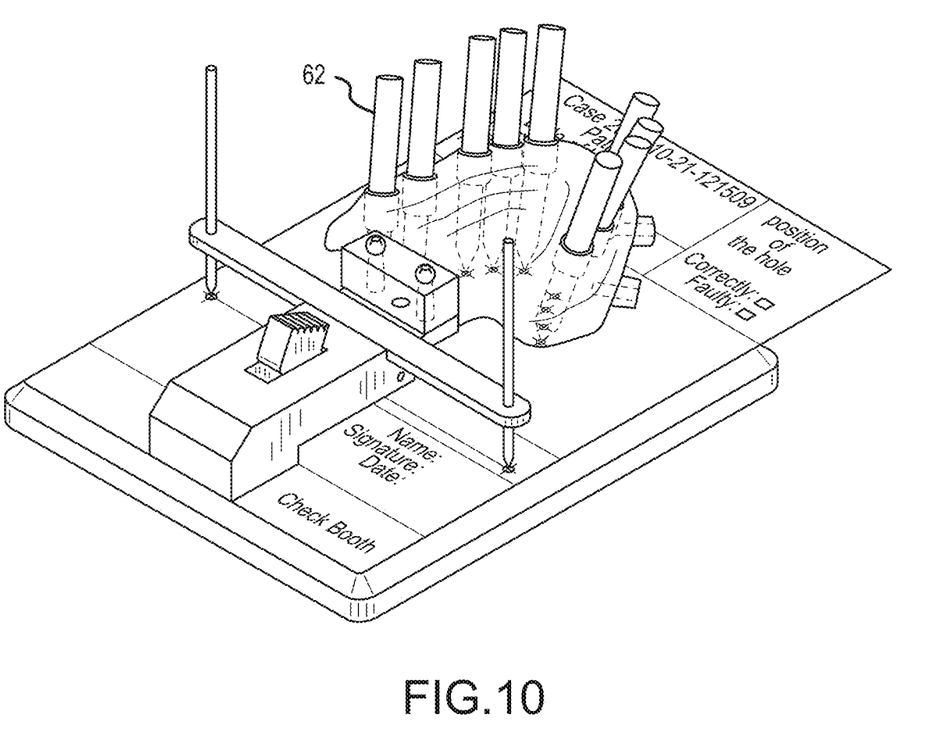
FIG. 10 illustrates check pins extending through the physical surgical guide, in accordance with at least one example of the present disclosure.
Figure 11:
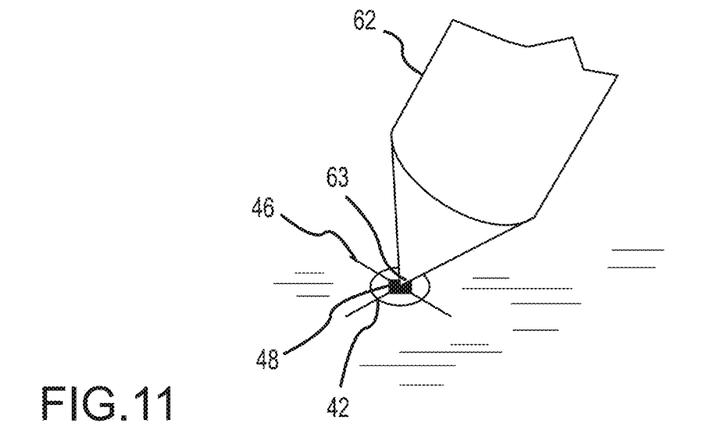
FIG. 11 illustrates a close-up of a pin in FIG. 10 contacting the check protocol form, in accordance with at least one example of the present disclosure.

FIG. 10 illustrates a plurality of check pins 62 extending through each master tube of the surgical guide. FIG. 11 illustrates a close-up a pin 62. A tip 63 of the pin 62 is shown being positioned within the circle 48 of the point 42. In one example, a user can visually verify if the tip 63 is within the circle 48 of each point 42. In another example, the tip 63 can be configured to leave a mark on the form 50 thus a user can not only visualize but also verify once the pins 62 are removed to see if the indentation or mark provided by the pin 62 is within the circle 48.

Figure 12:
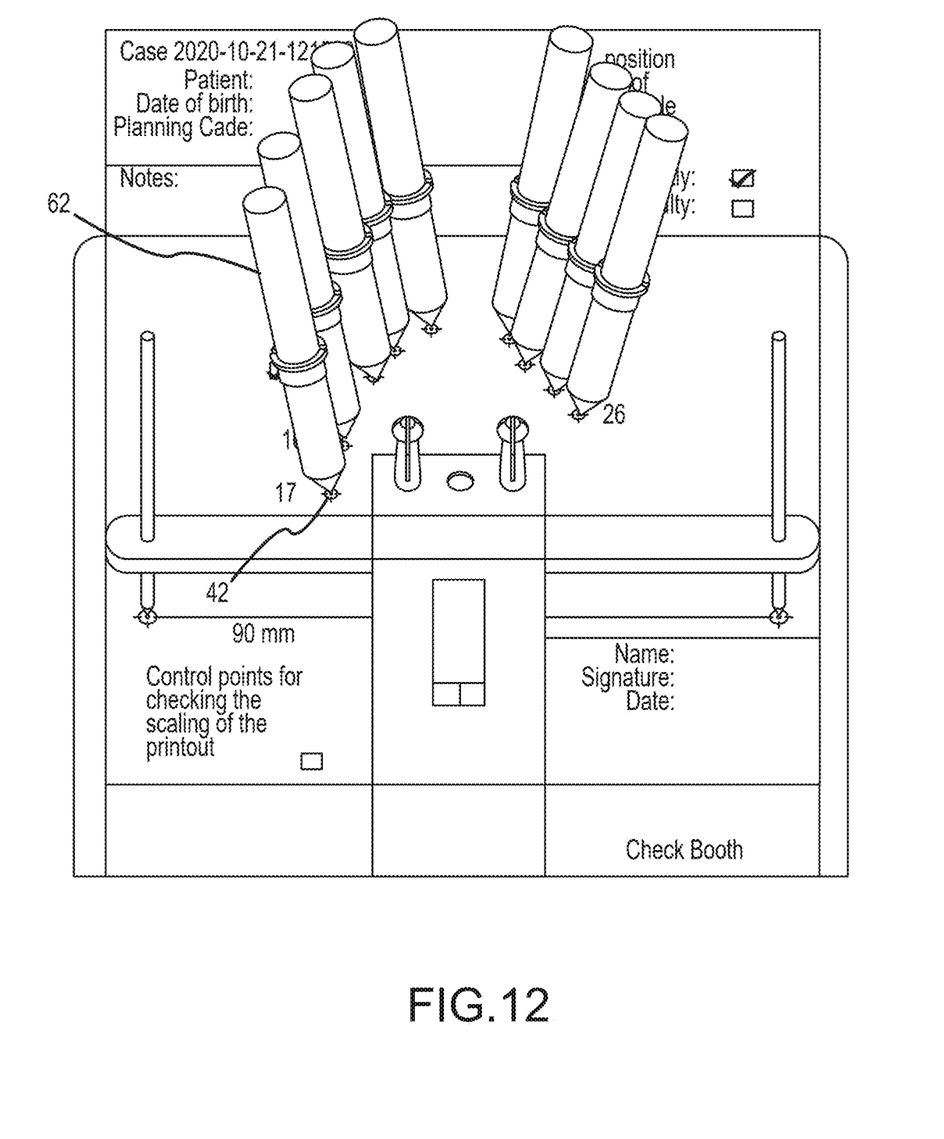
FIG. 12 illustrates the check pins in FIG. 10 without the surgical guide.

FIG. 12 illustrates FIG. 11 without the surgical guide body 12 for simplicity. As seen in FIG. 12, each pin 62 is within the point 42 corresponding to an axis of an implant in the surgical plan. Again, the pins represent the axis formed by the master tubes. Thus, in order to confirm the accuracy of the physical surgical guide, the axis of the pins 62 need to align within a certain tolerate of the axis of the implant in the surgical plan.

Figure 13:
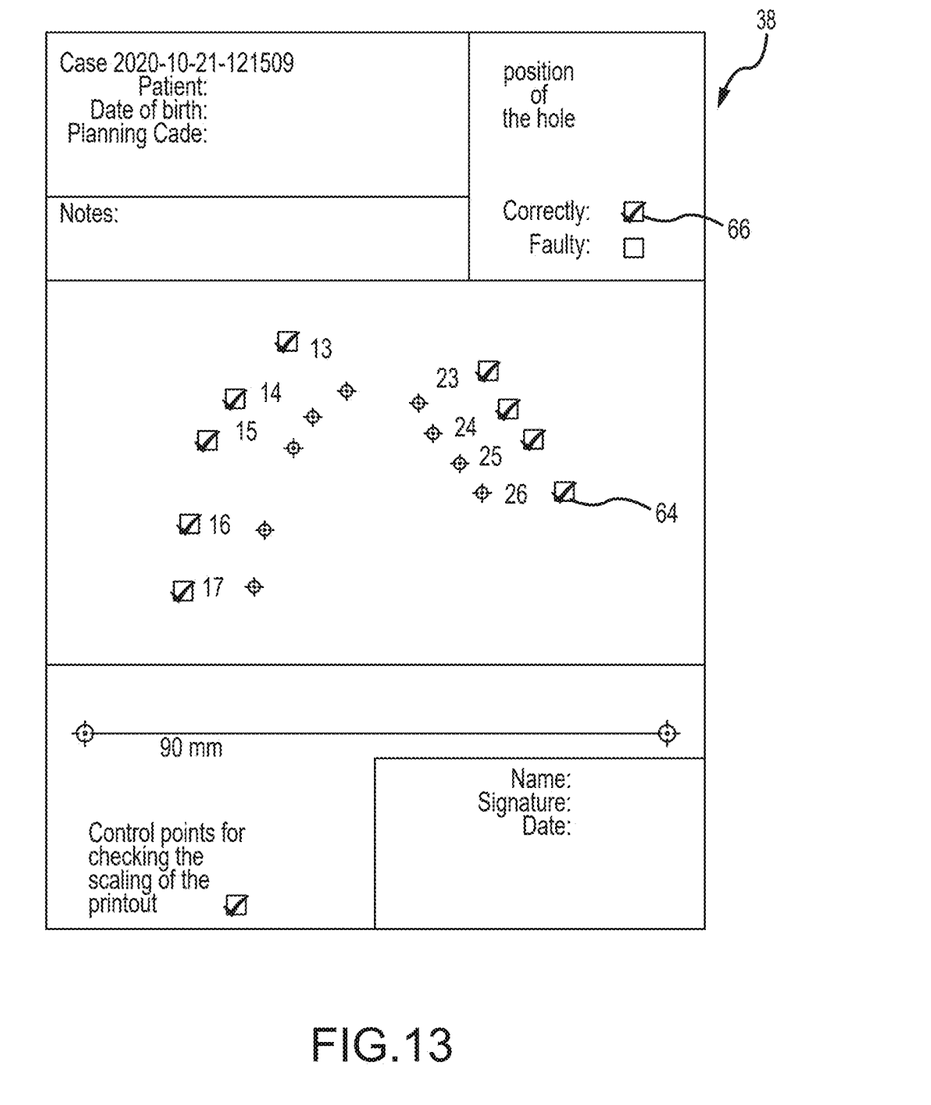
FIG. 13 illustrates a completed check protocol form confirming the accuracy of the physical surgical guide, in accordance with at least one example of the present disclosure.
Figure 14:
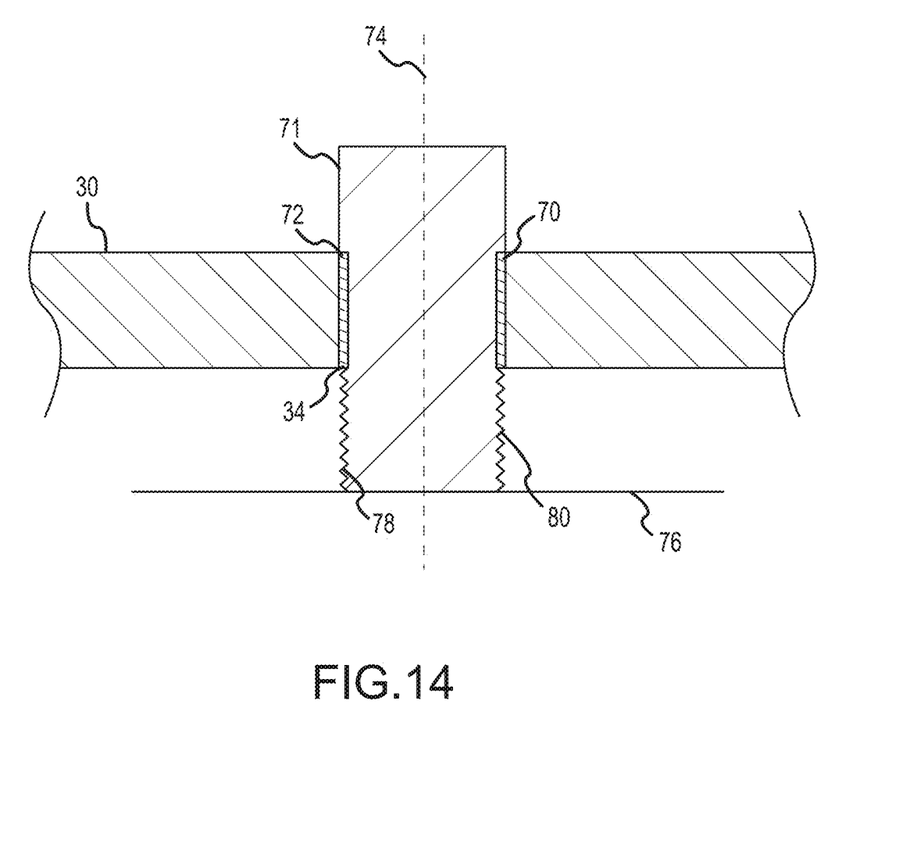
FIG. 14 illustrates a cross-sectional view of the physical surgical guide coupled with a scan body, in accordance with at least one example of the present disclosure.

FIG. 13 illustrates a completed check form 38 that includes accuracy check boxes 64 for each implant to be installed in a patient according to a surgical plan. If each check box 64 is marked for accuracy a final accuracy check box 66 can be marked. The physical surgical guide is now acceptable for use on a patient. If one of the pins does not align with the available tolerance, a user would select the faulty check box and a new surgical guide would need to be manufactured The devices and methods discussed above relate to physically checking the accuracy of the physical surgical guide. As discussed herein, the accuracy can also be check digitally. In that instance, after the physical surgical guide is manufactured a scanning body can be coupled to each master tube. FIG. 14 is a cross-section of a portion of the physical surgical guide 30 including the master tube 34. As seen in FIG. 14, a scanning body 71 can be coupled to the master tube 34. Various scanning bodies are contemplated, and the scan body only need to be accurately coupled to the surgical guide such that a central axis of the master tube can be determined. Thus, sufficient seating of the scanning body 71 is necessary. In one example, a top surface 72 of the master tube is configured to engage with a seating surface 70 of the scanning body 71. While the scan body 71 can simply sit on the master tube, some embodiments include placing the surgical guide on a scanning support 76 where the scanning support 76 can have a threaded opening 78 that can engage with a threaded surface of the scan body. Thus, the scan body 71 can be threaded into the scanning support 76 to securely hold the scanning body 71 to the surgical guide 30 for better accuracy.

Once the scan bodies 71 are coupled, the surgical guide 30 including the scan bodies 71 are scanned. A virtual representation of the physical guide 30 including the scan bodies 71 can be determined. Based on the scan body, a user can modify the virtual representation such that an axis 74 of the master tubes 34 can be virtually depicted. The scan data illustrates the axis 74 of the master tubes 34 can be compared to the axis of the implant in the surgical plan and determine if they align.

Having described a method of designing and checking the accuracy of the physical surgical guide with the surgical plan, the present disclosure also includes a computer system that may be employed in accordance with at least some of the example embodiments herein. Although various embodiments may be described herein in terms of this exemplary computer system, after reading this description, it may become apparent to a person skilled in the relevant art(s) how to implement the disclosure using other computer systems and/or architectures.

The computer system may include a scanner such as CBCT, MRI and/or intra-oral scanner for obtaining 3D images of the dental cavity. The computer system may also include at least one computer processor. The computer system may be configured to receive the 3D images and the processor may be configured to analyze said 3D images in order to create the rendering of the patient which may be displayed on a display of the computer system. In an embodiment herein the computer system may take input from a clinician through an input unit such as a keyboard, mouse, touchscreen monitor or the like in order to create the surgical plan.

A display interface (or other output interface) may forward video graphics, text, and other data from the communication infrastructure (or from a frame buffer (not shown)) for display on the display unit.

One or more steps of creating the surgical plan and checking the accuracy of the physical surgical guide may be stored on a non-transitory storage device in the form of computer-readable program instructions. To execute a procedure, the processor loads the appropriate instructions, as stored on the storage device, into memory, and then executes the loaded instructions.

The computer system may also comprise a main memory, which may be a random-access memory ("RAM"), and also may include a secondary memory. The secondary memory may include, for example, a hard disk drive and/or a removable-storage drive (e.g., a floppy disk drive, a magnetic tape drive, an optical disk drive, a flash memory drive, and the like). The removable-storage drive may read from and/or write to a removable storage unit 140 in a well-known manner. The removable storage unit may be, for example, a floppy disk, a magnetic tape, an optical disk, a flash memory device, and the like, which may be written to and read from by the removable-storage drive. The removable storage unit may include a non-transitory computer-readable storage medium storing computer-executable software instructions and/or data.

In further alternative embodiments, the secondary memory may include other computer-readable media storing computer-executable programs or other instructions to be loaded into the computer system. Such devices may include a removable storage unit and an interface (e.g., a program cartridge and a cartridge interface); a removable memory chip and an associated memory socket; and other removable storage units and interfaces that allow software and data to be transferred from the removable storage unit to other parts of the computer system.

The computer system also may include a communications interface that enables software and data to be transferred between the computer system and external devices. Software and data transferred via the communications interface may be in the form of signals, which may be electronic, electromagnetic, optical or another type of signal that may be capable of being transmitted and/or received by the communications interface. Signals may be provided to the communications interface via a communications path (e.g., a channel). The communications path may, carry signals and may be implemented using wire or cable, fiber optics, a telephone line, a cellular link, a radio-frequency ("RF") link, or the like. The communications interface may be used to transfer software or data or other information between the computer system and a remote server or cloud-based storage (not shown).

One or more computer programs or computer control logic may be stored in the main memory and/or the secondary memory. The computer programs may also be received via the communications interface. The computer programs may include computer-executable instructions which, when executed by the computer processor, cause the computer system to perform the methods described. Accordingly, the computer programs may control the computer system.

In another embodiment, the software may be stored in a non-transitory computer-readable storage medium and loaded into the main memory and/or the secondary memory of the computer system using the removable-storage drive, the hard disk drive, and/or the communications interface. Control logic (software), when executed by the processor, may cause the computer system, to perform all or some of the methods described herein.

VARIOUS NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 GER § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for checking the accuracy of a physical surgical guide fabricated based on a virtual surgical guide developed according to a virtual surgical plan, the method comprising:
    receiving scan data of the physical surgical guide including a master tube inserted into an opening of the physical surgical guide, wherein a scan body is coupled to the physical surgical guide via the master tube, and wherein the scan data includes data representing the scan body, data representing the master tube, and data representing the physical surgical guide;
    developing a virtual model of the scan data;
    merging the virtual model of the scan data with the virtual surgical guide to determine whether or not a central axis of the master tube inserted in the physical surgical guide matches a central axis of a virtual master tube in the virtual surgical guide within a predetermined tolerance; and
    confirming the accuracy of the physical surgical guide in response to determining that the central axis of the master tube inserted in the physical surgical guide matches the central axis of the virtual master tube in the virtual surgical guide within the predetermined tolerance.

2. The method in claim 1, wherein, in response to the central axis of the master tube inserted in the physical surgical guide matching with the central axis of the virtual master tube in the virtual surgical guide within the predetermined tolerance, determining the physical surgical guide is suitable for use with a patient.

3. The method of claim 1, wherein the scan body engages a seating surface of the master tube to accurately couple the scan body with the master tube.

4. A check booth system for use to determine the accuracy of a physical surgical guide manufactured based on a virtual surgical plan including at least one virtual implant and a virtual surgical guide including at least one master tube, the check booth system comprising:
  a support surface; and
  a checking support coupled to the support surface,
  wherein the support surface is configured to receive a check protocol form, and
  wherein the checking support includes a calibration member having openings and a support structure configured to engage with the physical surgical guide.

5. The system of claim 4, further including:
a plurality of calibration pins extending from a first end to a tip, the diameter of the calibration pins corresponding to the diameter of the openings of the calibration member.

6. The system of claim 4, further including:
a plurality of check pins extending from a first end to a tip, wherein at least a first check pin of the plurality of check pins has a first diameter that is different from a diameter of a second check pin of the plurality of check pins.

7. The system of claim 4, further including:
a plurality of check pins that can be used to extend through a plurality of master tubes having different diameters.

8. The system of claim 4, further including a plurality of check pins extending from a first end to a tip, wherein the tip is configured to leave a mark on the check protocol form.

9. A non-transitory computer readable medium for checking the accuracy of a physical surgical guide fabricated based on a virtual surgical guide developed according to a virtual surgical plan, the non-transitory computer readable medium comprising instructions, which when executed by at least one processor, configure the at least one processor to perform operations comprising:
  receiving scan data of the physical surgical guide including a master tube inserted into an opening of the physical surgical guide, wherein a scan body is coupled to the physical surgical guide via the master tube, and wherein the scan data includes data representing the scan body, data representing the master tube, and data representing the physical surgical guide;
  developing a virtual model of the scan data;
  merging the virtual model of the scan data with the virtual surgical guide to determine whether or not a central axis of the master tube inserted in the physical surgical guide matches a central axis of a virtual master tube in the virtual surgical guide within a predetermined tolerance; and
  confirming the accuracy of the physical surgical guide in response to determining that the central axis of the master tube inserted in the physical surgical guide matches the central axis of the virtual master tube in the virtual surgical guide within the predetermined tolerance.

10. The non-transitory computer readable medium of claim 9, wherein, in response to the central axis of the master tube inserted in the physical surgical guide matching with the central axis of the virtual master tube in the virtual surgical guide within the predetermined tolerance, determining the physical surgical guide is suitable for use with a patient.

11. The non-transitory computer readable medium of claim 9, wherein the scan body engages a seating surface of the master tube to accurately couple the scan body with the master tube.

12. The non-transitory computer readable medium of claim 9, wherein the predetermined tolerance is defining an acceptable tolerance of a central axis of the scan body using a circle surrounding a center point, wherein the center point coincides with the central axis.

13. A system for checking the accuracy of a physical surgical guide fabricated based on a virtual surgical guide developed according to a virtual surgical plan, the system comprising:
  at least one processor;
  a storage device comprising instructions, which when executed by the at least one processor, configure the at least one processor to perform operations comprising:
    receiving scan data of the physical surgical guide including a master tube inserted into an opening of the physical surgical guide, wherein a scan body is coupled to the physical surgical guide via the master tube, and wherein the scan data includes data representing the scan body, data representing the master tube, and data representing the physical surgical guide;
    developing a virtual model of the scan data;
    merging the virtual model of the scan data with the virtual surgical guide to determine whether or not a central axis of the master tube inserted in the physical surgical guide matches a central axis of a virtual master tube in the virtual surgical guide within a predetermined tolerance; and
    confirming the accuracy of the physical surgical guide in response to determining that the central axis of the master tube inserted in the physical surgical guide matches the central axis of the virtual master tube in the virtual surgical guide within the predetermined tolerance.

14. The system of claim 13, wherein, in response to the central axis of the master tube inserted in the physical surgical guide matching with the central axis of the virtual master tube in the virtual surgical guide within the predetermined tolerance, determining the physical surgical guide is suitable for use with a patient.

15. The system of claim 13, wherein the scan body engages a seating surface of the master tube to accurately couple the scan body with the master tube.

16. The system of claim 13, the at least one processor further configured to:
  receiving scan data of a patient's mouth;
  transferring the scan data to a computer program;
  creating a three-dimensional model of at least a portion of the patient's mouth on the computer program using the scan data; and
  developing the virtual surgical plan based on the scan data of the patient's mouth, the virtual surgical plan including a virtual implant, the virtual surgical guide, and the virtual master tube.

* * * * *